Jan. 7, 1964  C. J. ADAMS  3,117,205
ROD-IN-TUBE ACTUATED TEMPERATURE SENSING DEVICE
Filed Jan. 27, 1961  2 Sheets-Sheet 1

Inventor:
Charles J. Adams,
by *Irving H. Mershman*
Attorney.

# United States Patent Office 3,117,205
Patented Jan. 7, 1964

3,117,205
ROD-IN-TUBE ACTUATED TEMPERATURE
SENSING DEVICE
Charles J. Adams, Bloomington, Ill., assignor to General
Electric Company, a corporation of New York
Filed Jan. 27, 1961, Ser. No. 85,332
10 Claims. (Cl. 200—137)

This invention relates to thermally responsive switching devices and more particularly to a miniature thermostatic switch especially adapted for use in a temperature control system for a small electric motor or the like.

The invention has as a principal object the provision of a specially constructed thermostatic switch or temperature probe of such small dimensions that it may usually be inserted into the completed windings of a small electric motor or into any other dense, compact equipment, subject to overtemperature conditions without disturbing the surrounding environment or requiring any substantial adaptive alterations.

The present invention relates to the general class of devices that include a snap switch connected to a thermally responsive rod-in-tube unit in which the rod and tube are formed of metals having dissimilar coefficients of thermal expansion and are fastened at one end to permit a differential switch actuating movement of their opposite ends with temperature changes. A motion amplifying lever is usually connected to the actuating end of the rod-in-tube unit and the lever in turn operates a snap spring which in turn actuates the snap switch. Heretofore it has not been customary to include the snap spring in the electrical circuit of which the snap switch is a part and it has been customary also to form the lever of metal whereby to provide an additional spring action therefrom.

Many attempts have been made heretofore to reduce the size of such thermostatic switches since the total mass of the sensing element should be as small as possible to introduce the smallest disturbance necessary into the environment to be measured. Furthermore, a massive sensing element which represents a relatively large heat sink will respond relatively slowly to temperature variations because of the large amount of heat required to elevate its temperature. There also are many applications for thermostatic switches where the space available for the sensing element is extremely limited. In the general class of thermostatic switches with which this invention is concerned, it has been thought heretofore that the greatest reduction in size had been already achieved and that any further decrease in the dimensions or mass in the thermostatic switch was not possible. Consequently, where limited space and limited mass are important, such thermally responsive rod and actuating switch have fallen in disfavor while an increase has been noted in the use of various resistance temperature detectors which generally are more expensive and require highly critical circuitry.

It has now been found possible to effect a considerable additional reduction in the dimensions and mass of rod-in-tube actuated thermostatic switches by incorporating the snap spring as a part of the electrical switch actuated by the rod-in-tube unit and by forming the motion transmitting lever of a heat insulating and electrical insulating material such as a ceramic whereby to reduce the number of parts required thus decreasing the size of the thermostatic switch and also substantially reducing the heat capacity thereof since the heat insulating lever effectively isolates the rod-in-tube temperature sensing unit from the other portions of the temperature probe.

Heretofore it has been customary in devices of this type to provide a rod-in-tube unit in which both the rod and tube have sufficient mass and cross section to be essentially rigid. As a result the relative displacement of the ends of the rod and tube have varied substantially directly with temperature changes regardless of the load imposed upon these elements. This has been considered necessary heretofore in order to achieve repeatable accuracy in operation of the thermostatic switch. This design of the rod and tube has seriously limited the possible reduction in the dimensions of such thermostatic switches.

According to the present invention the rod and the tube of the thermostatic switch are constructed to have inherent spring-like resiliency such that in response to temperature variations portions of the rod and the tube are compressed and stretched whereby to place certain portions thereof in elastic compression and other portions in elastic tension when the movement of the actuating end thereof is applied to the operating lever. The actual dimension change of the rod-in-tube unit is in fact a function not only of the ambient temperature variations but also of the switch actuating force imposed upon it. One characteristic by which this important distinction may be recognized is that in thermostatic switches made in accordance with the present invention, the total displacement between the switch actuating ends of the rod-in-tube unit between reset temperature and trip temperature is substantially greater than the displacement actually required to actuate the switch. The extra displacement not to be observed in rod-in-tube actuating switches having essentially rigid rod and tubes is due to the deliberate and desirable dimensional changes stored in the device by the elastic compression and elastic tension of the rod-in-tube unit.

In accordance with the principles of this invention it has been found possible to produce a thermostatic switch having a rod-in-tube unit so small in diameter that it may be inserted as a probe into the minor voids which naturally occur within the field windings of a small electric motor, where it may respond very rapidly to an incipient overtemperature condition without requiring any substantial adaptive alterations. It is to be understood that the devices constructed in accordance with the present invention have utility in any environment where it is desired to perform a switching operation in response to a change in temperature, but the devices of the present invention are especially suitable for use where the available space and the permissible mass of the temperature sensor are limited.

Further features of the invention pertain to the particular arrangement of the elements of the thermostatic switch and the method of operation thereof, whereby the above outlined and additional operating features are attained.

This invention both as to its organization and method of operation together with further objects and advantages thereof will best be understood by reference to the following specification taken in connection with the accompanying drawings, in which.

Figure 1:
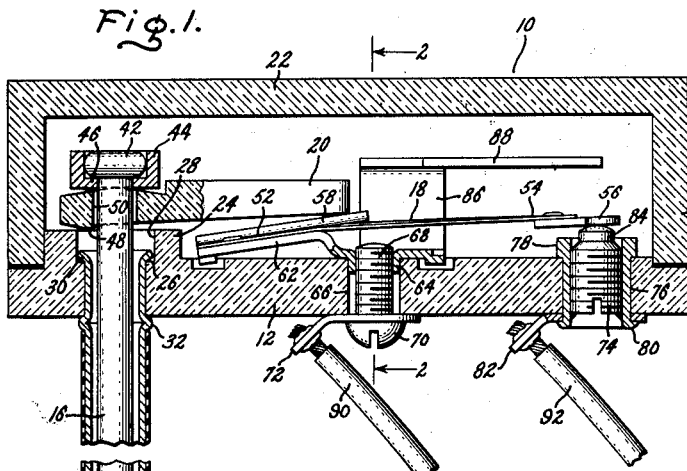
FIGURE 1 is an enlarged view in vertical section through a thermostatic switch made in accordance with and incorporating therein the principles of the present invention.

There is shown in FIGS. 1 to 4 of the drawings a miniature thermostatic switch generally designated by the numeral 10 made in accordance with and embodying the principles of the present invention therein. The thermostatic switch 10 comprises generally a base 12 upon which is mounted a tube 14 within which is disposed a movable rod 16, a snap action spring 18, lever 20 and a case or cover 22 enclosing all parts of the thermostatic switch 10 disposed on the upper side of base 12 as viewed in FIG. 1. The base 12 is generally rectangular in shape as may be best seen in FIG. 3 and is preferably formed of a material which has both electrical insulating and heat insulating properties, a suitable material of construction being steatite, the compact massive variety of a natural hydrous magnesium silicate. In a typical construction the base 12 may have an overall length of 1.2 inches and a width of 0.4 inch whereby to provide a relatively small size for the associated portion of the thermostatic switch 10. There is formed on the upper surface of the base 12 adjacent to the left-hand end thereof as viewed in FIG. 1 an upstanding annular projection 24 having formed concentrically therewith a circular opening through the base 12 perpendicular to the larger surface thereof and provided internally with a shoulder 26 formed by a bore 28 concentric with the opening therethrough but slightly larger in diameter.

Disposed within the opening extending through the left-hand end of the base 12 is the tube 14 which is provided at the upper end thereof with an outwardly flared portion 30 pressed against the shoulder 26. Intermediate the ends of the tube 14 and adjacent to the underside of the base 12 there is formed an outwardly extending shoulder 32 which is pressed against the underside of the base 12 whereby the outwardly flared end 30 and the shoulder 32 serve fixedly to mount the tube 14 upon the base 12 and extending through the opening therein, the longitudinal axis of the tube 14 being disposed substantially perpendicular to the underside of the base 12 as viewed in FIG. 1. The end of the tube 14 opposite the base 12 has a portion 34 of reduced diameter which is internally threaded.

Disposed within the tube 14 and extending substantially the entire length thereof is the rod 16 which has an external diameter sufficiently less than the internal diameter of the tube 14 so that the rod 16 can fit easily within the tube 14 and contacts the tube 14 only at the lower end thereof as viewed in FIG. 1. More specifically, the lower end of the rod 16 is provided with threads as at 36, the threads 36 engaging the thread on the reduced portion 34 of the tube 14 whereby to provide a firm connection between the tube 14 and the rod 16 which permits factory adjustment of the parts prior to final assembly thereof. After final assembly of the parts, a rigid connection between the tube 14 and rod 16 is provided by solder as at 38 thereby preventing inadvertent rotation between the tube 14 and the rod 16. Disposed about the tube 14 and providing an electrical insulation therefor is a sheet 39 of synthetic organic plastic such as a plastic sold under the trademark "Mylar" and comprising essentially a polyester plastic, such for example, the condensation product of ethylene glycol and terepthalic acid, the covering 39 being formed as a tube which is heat shrunk upon the tube 14 to provide a good fit therewith. The cover 39 extends from the shoulder 32 past the outer end of the tube 14. It will be understood that other suitable plastic coatings can be provided upon the tube 14, for example, a dip coating with an epoxy resin or the like.

The tube 14 and the rod 16 are formed of metal having different coefficient of thermal expansion whereby these parts serve to form a rod-in-tube type of temperature sensing unit generally designated by the numeral 40 in the drawings. More specifically the tube 14 is preferably formed of 304 austenitic stainless steel and the rod 16 is preferably formed of 416 martensitic stainless steel having a coefficient of thermal expansion less than that of the 304 austenitic stainless steel. Since the ends of the tube 14 and the rod 16 disposed away from the base 12 are rigidly connected and since the outer end of the tube 14 is rigidly connected to the base 12, the upper end of the rod 16 moves relative to the base 12 in accordance with the differential expansion between the tube 14 and the rod 16. It will be seen that the plastic cover 39 is in direct contact with the medium of which the temperature is being sensed and forms a slight heat insulation as well as electrical insulation for the tube 14. As a consequence there is a time lag between a rise in temperature of the medium and the heating of the metal forming the tube 14 and it is desirable to compensate for this temperature lag, this compensation being afforded by the differential expansion between the tube 14 and the rod 16. More specifically, the rod 16 is shielded from the ambient temperature by both the cover 39 and the tube 14 whereby the material of the tube 14 will begin to expand rapidly upon a rise in the ambient temperature before there has been any appreciable expansion of the rod 16. Consequently, in the case of a rapid rise in the ambient temperature about the rod-in-tube unit 40, the tube 14 will expand substantially before there is any appreciable expansion of the rod 16 whereby to provide a rapid response to the change in temperature to cause actuation of the thermostatic switch 10 at a relatively lower temperature, and thus to compensate at least in part for the temperature lag through the insulating cover 39 around the tube 14. On the other hand, when the temperature of the medium surrounding the tube 14 rises slowly so as to permit time for heat to be transferred from the tube 14 to the rod 16 so that the rod 16 is heated at substantially the same rate as the tube 14, the rod-in-tube unit 40 will actuate the thermostatic switch 10 at a relatively higher temperature. The described construction therefore provides a further protective feature in that rapid rises in the temperature of the medium surrounding the rod-in-tube unit 40 causes early actuation of the thermostatic switch 10, i.e., actuation of the thermostatic switch 10 at a lower temperature than that at which it is actuated if the temperature of the medium surrounding the tube 14 increases at a slower rate, thus to compensate for the temperature lag between the medium surrounding the rod-in-tube unit 40 and the material forming the tube 14 which is caused at least in part by the insulating cover 39. In order to be useful in the very small spaces in which it is contemplated that the thermostatic switch 10 will be used, and in order to minimize the effect of the heat capacity of the thermostatic switch 10 upon the ambient condition being measured, it has been found desirable to select certain relations among the dimensions of the tube 14 of the rod 16. For example, it has been found desirable that the ratio of the surface area of the tube 14 to the volume thereof be at least about 40 and that the ratio of the diameter of the tube 14 to the thickness of the wall thereof be about 8 and that the ratio of the cross-sectional area of the rod 16 to the cross-sectional area of the tube 14 be about 6. In a typical illustrative example of a rod-in-tube sensing unit 40 made in accordance with these requirements, the tube 14 may have an external diameter of 0.093 inch and a wall thickness of about 0.012 inch. These dimensions will give a surface area to volume ratio for the tube 14 of about 43 and a ratio of the diameter of the tube 14 to the wall thickness thereof of about 7.75. The rod 16 may have a diameter of 0.060 inch, thereby to provide a ratio between the cross-sectional area of the rod 16 and the cross-sectional area of the tube 14 of about 6.25. The length of the unit 40 below the base 12 may be about 2 inches. The parts when so dimensioned can be readily fitted into even the smallest of spaces and will produce the least disturbance to the ambient condition being measured, compatible with providing the necessary driving force and a desirable resilience and a useful elastic compression and elastic tension therein which will be described more fully hereinafter.

The driving force and relative movement between the upper end of the rod 16 and the base 12 as viewed in FIG. 1 must be transmitted to the lever 20 and for this purpose the upper end of the rod 16 is provided with an enlargement or head 42. Cooperating with the head 42 is a bushing 44 which is generally cylindrical in shape and has a recess therein to receive the head 42 and a bottom wall 46 having an opening therein to receive the rod 16 therethrough, the bottom wall 46 of the bushing 44 bearing against the upper surface of the lever 20. The bushing 44 must be mechanically strong and must resist the abrasive action of the ceramic lever 20 which is made of a hard material; a suitable material for forming the bushing 44 is a stainless steel which readily work hardens to provide a surface in contact with the ceramic lever 20 which can readily resist the abrasive action thereof.

In accordance with the present invention the lever 20 is formed of a material having good heat insulating and electrical insulating properties and may be formed, for example, of a high alumina ceramic which is in addition mechanically strong whereby to transmit the force generated by the temperature sensing unit 40 to the snap spring 18. The left-hand end of the lever 20 as viewed in FIG. 1 is provided with a sharp pivot edge 48 which bears against the upper surface of the annular projection 24 and serves as the fulcrum for the lever 20. The lower edge of the lever 20 inclines upwardly in both directions from the pivot edge 48 to permit the lever 20 to be pivoted about the edge 48. There is formed in the lever 20 an opening 50 extending vertically therethrough and disposed to the right of the pivot edge 48 as viewed in FIG. 1 to receive therethrough the rod 16, the lower surface of the bushing 44 resting against the upper surface of the lever 20 about the opening 50, thereby to form a loose connection between the upper end of the rod 16 and the lever 20. When the rod 16 is moved downwardly, the head 42 thereof pushes against the bushing 44 which in turn bears against the upper surface of the lever 20 to pivot the right-hand end of the lever 20 as viewed in FIG. 1 downwardly about the pivot edge 48, the mechanical advantage of the lever 20 being about 10.

Figure 2:
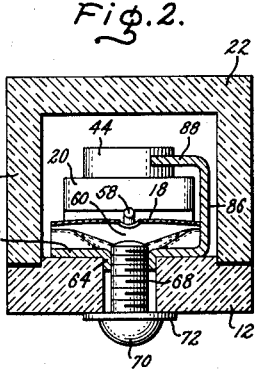
FIG. 2 is a view in vertical section through the thermostatic switch of FIG. 1 along the line 2—2 thereof.
Figure 3:
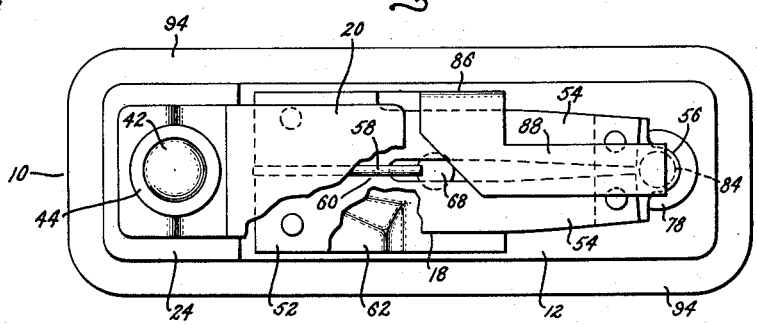
FIG. 3 is a plan view with the case removed and certain portions in section of the thermostatic switch illustrated in FIG. 1.
Figure 4:
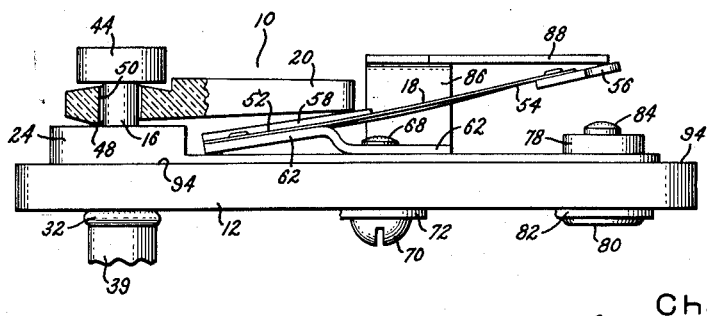
FIG. 4 is a fragmentary view similar to FIG. 1 with certain portions in section showing the snap spring in the actuated and circuit interrupting position thereof.

The snap spring 18 may be formed of "Inconel X" metal about 0.005 inch thick and includes a base 52 (see FIG. 3) from which extend two arms 54 which are preferably rectangular in plan view but are forced inwardly toward each other at the outer ends thereof and secured in this deformed position by means of a clamp 56 whereby to hold the snap spring 18 in a crowned or concave-convex form illustrated best in FIGS. 1 and 2 of the drawings. Secured to the base 52 is a wire 58, the wire 58 being oriented in the direction of the arms 54 and disposed therebetween and secured to the base 52 throughout the length thereof. The wire 58 covers a sensitive area 60 on the snap spring 18, the area 60 being at the top of the crown of the snap spring 18 and serving to deform the snap spring 18 to the position illustrated in FIG. 4 upon the application of a predetermined force thereto moving through a predetermined small distance. The right-hand end of the lever 20 bears against the wire 58 and is adapted to apply a force to the snap spring 18 from the rod-in-tube unit 40 to move the snap spring 18 between the positions illustrated in FIGS. 1 and 4 of the drawings. By utilizing the wire 58, the force from the lever 20 is always applied against the sensitive area 60 on the snap spring 18 even though the lever arm 20 may inadvertently shift in a lateral direction, as viewed in FIG. 3, during use and any such shifting of the lever arm 20 laterally with respect to the wire 58 will not substantially change the mechanical advantage presented by the lever 20, thereby to insure that the temperature of actuation of the snap spring 18 is substantially the same even though the lever 20 shifts laterally with respect to the wire 58 during use. The left-hand end of the snap spring 18 as viewed in FIGS. 1 and 4 is secured to the base 12 by means of a support generally designated by the numeral 62 and formed of a suitable metal such as stainless steel. More specifically, the left-hand end of the support 62 as viewed in FIG. 1 is firmly secured to the left-hand end of the snap spring 18, the support 62 providing a firm base against which the edges of the snap spring 18 engage in order to provide the desired snap action thereof. Formed integral with the right-hand end of the support 62 as viewed in FIG. 1 is a cylindrical embossment 64 extending downwardly and into an aperture 66 extending through the base 12. The internal surfaces of the embossment 64 are threaded and threadedly receive a complementarily threaded screw 68 having an enlarged head 70 which holds in operable position a first solder lug 72. The support 62 with the snap spring 18 mounted thereon is thus held in a fixed position with respect to the base 12.

A first stop member or contact for the free outer end of the snap spring 18 and particularly for the contact clamp 56 thereon is provided in the form of a contact screw 74 which is made of a good electrical conducting material and may be formed, for example, of silver plated with gold. Provided in the base 12 and extending therethrough is a bushing 76 having an outwardly extending shoulder 78 on one end thereof engaging the upper surface of the base 12 and an out-turned flange 80 on the other end thereof holding a second solder lug 82 against the undersurface of the base 12. The internal surface of the bushing 76 is threaded and threadedly engages complementary threads on the outer surface of the contact screw 74 whereby to permit adjustment of the screw 74 with respect to the base 12 thereby to adjust the upper contact end 84 thereof with respect to the base 12.

The contact screw 74 and the snap spring 18 form the two contacts for a switch and to this end the solder lug 72 has fixedly connected thereto by soldering a first electrical conductor 90 and the solder lug 82 has a second electrical conductor 92 similarly connected thereto. A connection between the conductors 90 and 92 can be traced from the solder lug 72, to the screw 68, to the support 62, to the snap spring 18, to the clamp 56, to the screw 74, to the bushing 76, to the solder lug 82, and thence to the second conductor 92. When a suitable force is applied to the sensitive area 60 of the snap spring 18 by means of the lever 20, the outer end and particularly the clamp 56 of the snap spring 18 is moved from electrical contact with the contact screw 74 into contact with the arm 88, thereby interrupting the connection between the conductors 90 and 92, the arm 88 being in electrical contact with the snap spring 18 through the U-shaped portion 86 which is an integral part of support 62.

All of the parts on the upper surface of the base 12 as viewed in FIGS. 1 and 2 of the drawings are enclosed and protected by the case or cover 22 which has a general outline like the base 12, the base 12 having a recess or shoulder 94 formed around the entire outer periphery thereof to receive the downwardly extending wall 96 of the cover 22. The cover 22 is formed of an electrical insulating and heat insulating material such as steatite and thus provides both electrical insulation and thermal insulation for all the parts mounted upon the upper surface of the base 12 as viewed in FIGS. 1 and 2 of the drawings.

In the use of the thermostatic switch 10, the rod-in-tube sensing unit 40 is inserted into the area where it is desired to sense the temperature and because of the small dimensions of the parts making up the unit 40, the thermostatic switch 10 can be used in a wide variety of electrical devices which are not large enough to receive the temperature sensing units available heretofore. The relatively large surface area of the unit 40 as compared to the volume thereof (the ratio between the surface area and the volume being at least 40) insures that the path for the heat needed to operate the unit 40 is large compared to the heat sink represented by the unit 40. In addition the dimensions of the rod 16 and the tube 14 insure that these parts are resilient enough to undergo substantial elastic compression and elastic tension, respectively, during operation thereof and it is preferred that the dimensional change of the unit 40, i.e., the movement of the head 42 with respect to the base 12, be divided into essentially two equal parts, whereby approximately one-half of the dimensional change and the accompanying force generated thereby is transmitted by the lever 20 to the sensitive area 60 of the snap spring 18 and about half the dimensional change and the force generated thereby is stored as elastic compression and elastic tension in the tube 14 and the rod 16, respectively. This is desirable since the snap spring 18 is of the type which substantially instantaneously moves from the position illustrated in the position of FIG. 1 to that illustrated in FIG. 4 upon the application of a predetermined force to the sensitive area 60 thereof. Upon movement of the snap spring 18 from the condition illustrated in FIG. 1 to that illustrated in FIG. 4, the sensitive area 60 moves downwardly a certain predetermined distance and it requires a certain residual pressure to hold the parts in the position illustrated in FIG. 4. In order properly to operate the snap spring 18, the temperature sensing unit 40 acting through the lever 20 must be able to follow the movement of the sensitive area 60 as the snap spring 18 moves from the position illustrated in FIG. 1 to that illustrated in FIG. 4 and must immediately supply the added force needed to hold the parts in the position illustrated in FIG. 4 of the drawings.

Figure 5:
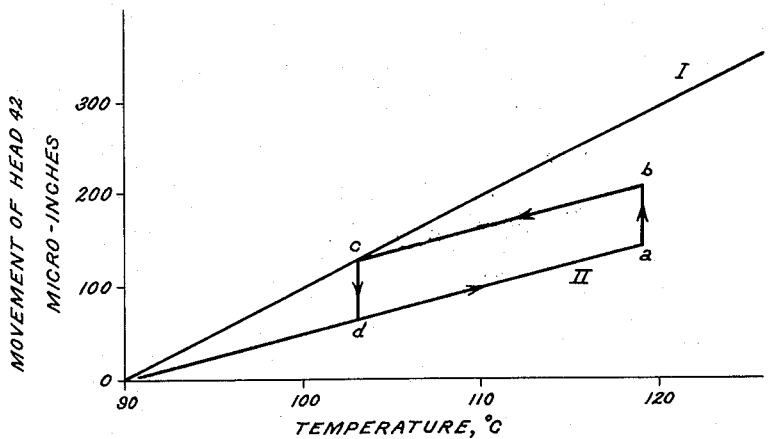
FIG. 5 is a graph showing the movement in micro-inches of the actuated end of the rod-in-tube unit with changes in temperature.
Figure 6:
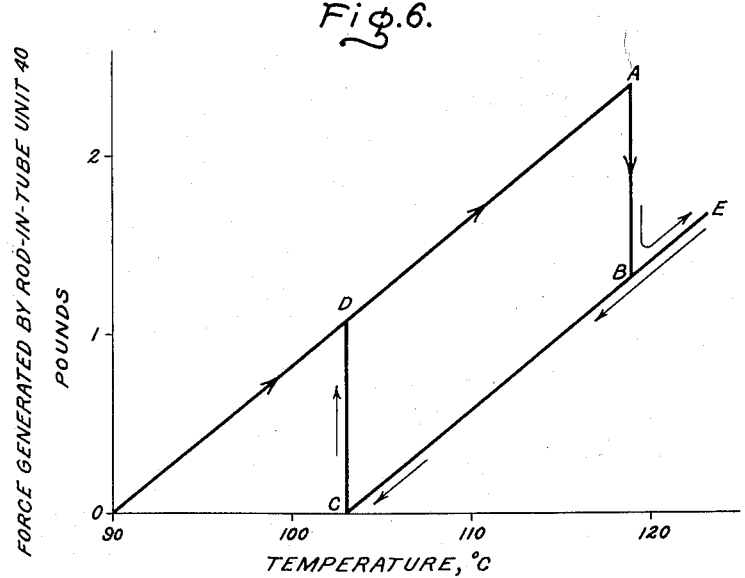
FIG. 6 is a graph showing the relation between the force generated by the rod-in-tube unit and the ambient temperature therearound.

The manner in which this is accomplished by the thermostatic switch 10 is graphically illustrated in FIGS. 5 and 6 of the drawings wherein the operating characteristics of the device have been plotted. Referring to FIG. 5 there is shown a first curve I which plots the movement of the head 42 of the temperature sensing unit 40 against the temperature of the environment surrounding the unit 40, the movement of the head 42 being measured in micro-inches and the temperature of the surroundings in degrees centigrade. It will be seen that the curve I is substantially a straight line and indicates a movement of the head 42 in the order of about 10 micro-inches for each degree of temperature change, the curve I being determined with the lever 20 removed whereby to uncouple the unit 40 from the snap spring 18. The curve II in the general form of a closed parallelogram is a plot of the movement of the head 42 with the lever 20 contacting the bushing 44 and bearing against the sensitive area 60 of the snap spring 18. It will be seen that the snap spring 18 and the associated parts exert a counter force which restrains movement of the head 42. More specifically using 90° C. as the point of initial movement of the head 42, an increase in the temperature to 100° C. results in a movement of the head 42 of approximately 50 micro-inches, an amount substantially half of that achieved when there is no load placed upon the unit 40 as represented by the curve I. A continued rise in the temperature to 103° C., the reset temperature for the thermostatic switch 10, results in further movement of the head 42 to a point corresponding to approximately 60 micro-inches, this point being designated by the letter d. Further heating of the unit 40 raises the temperature to about 119° C., the trip temperature for the snap spring 18, the snap spring 18 moving from the position illustrated in FIG. 1 to that illustrated in FIG. 4 at this temperature, this point being designated by the letter a. Immediately upon reaching point a the snap spring 18 operates and the sensitive area 60 moves and the head 42 must move a corresponding distance to the point b on the curve II with no change in temperature. This latter movement of the head 42 is obtained from the elastic compression and the elastic tension built up in the tube 14 and the rod 16, respectively, these forces producing the necessary movement of the head 42 upon movement of the snap spring 18 from the condition illustrated in FIG. 1 to that illustrated in FIG. 4. As the medium about the unit 40 cools from 119° C. to 103° C., the head 42 moves also to permit movement of the outer end of the lever 20 upwardly and at 103° C. the force applied by the lever 20 is such that it permits the snap spring 18 to move from the condition illustrated in FIG. 4 to that illustrated in FIG. 1. Immediately the head 42 moves from point c to point d as the contact clamp 56 moves from the arm 88 and against the contact 84. The apparatus is now in a position to repeat the cycle from d to a to b to c to d.

The curve of FIG. 6 illustrates that approximately one-half of the force generated by the rod-in-tube unit 40 serves to move the snap spring 18 from the condition illustrated in FIG. 1 to that illustrated in FIG. 4 while maintaining a substantial residual force to follow the movement of the snap spring 18 to insure that it is held in the condition illustrated in FIG. 4 until the temperature returns to the reset value. In FIG. 6 the capital letters therein correspond to the same points as the lower case letters in FIG. 5 and in a typical operating cycle the temperature in rising from 90° C. to 103° C. generates a force that varies from zero pounds at 90° C. to about 1.1 pounds at 103° C., the reset temperature. Continued heating of the medium surrounding the unit 40 results in an increase in the force generated by the rod-in-tube 40 until the trip temperature of 119° C. is reached at which time approximately 2.3 pounds of force have been generated by the unit 40. At this point the snap spring 18 moves from the condition illustrated in FIG. 1 to that illustrated in FIG. 4 and movement on the graph of FIG. 6 is from point A to point B. It is to be noted that at point B there is still a force of about 1.3 pounds provided by the unit 40, this being more than adequate to hold the snap spring 18 in the condition illustrated in FIG. 4. Because of the temperature lag in the unit 40, the parts thereof continue to expand thermally and there is additional force produced corresponding to movement on the graph of FIG. 6 from point B to point E. Upon cooling of the medium surrounding the unit 40, the force generated decreases from point E past point B and eventually to point C at the reset temperature of 103° C., substantially no force being generated by the unit 40 at this point. As a consequence, the force is removed from the sensitive area 60 of the snap spring 18 and it moves from the condition illustrated in FIG. 4 to that illustrated in FIG. 1, thereby to apply a counter force to the unit 40 which immediately develops an effective force of 1.1 pounds, this being graphically illustrated by movement from point C to point D on the curve of FIG. 6. Typically the cycle would then be repeated from point D to point A to point B to point E, then back to point B to point C and finally to point D.

By making the snap spring an integral part of the switch of the thermostatic unit 10, a substantial saving in size is realized while maintaining accurate and efficient operation thereof. By utilizing an insulating material for the lever 20, effective electrical insulation is provided between the rod-in-tube unit 40 and the various components of the switch including the snap spring 18 and the contact screw 74. By forming the lever 20 of a material which is also heat insulating in character, the total effective heat sink presented by the thermostatic switch 10 is substantially decreased since the only parts that are actually thermally in contact with the medium about the unit 40 are the tube 14 and the rod 16 and the bushing 44.

It will be seen that there has been provided a temperature probe in the form of a thermostatic switch which fulfills all the objects and advantages set forth above. More specifically, an improved thermostatic switch has been provided in which the snap spring forms a part of the switch whereby to reduce the number of components and size of the overall unit and to simplify construction thereof. By forming the lever arm 20 of electrical and heat insulating material, it is possible to utilize the snap spring 18 as a part of the switch and also substantially to reduce the effective heat sink represented by the thermostatic switch since the heat capacity of the snap spring and all parts in physical rod-in-tube unit 40. In addition the rod-in-tube unit 40 has been formed of materials and in a particular configuration which insures that these parts undergo elastic compression and tension whereby to permit storing of approximately half the force and half the movement of the rod-in-tube unit 40 as elastic compression and elastic tension of the parts whereby to insure that the rod-in-tube unit can follow the movement of the snap spring 18 fully and immediately and apply a force which insures that the snap spring 18 is retained in the actuated position thereof until the temperature of the medium surrounding the rod-in-tube unit 40 falls to the reset value thereof.

While there has been described what is presently considered to be the preferred embodiment of the invention, it will be understood that various modifications may be made therein, and it is intended to cover in the appended claims all such modifications that fall within the true spirit and scope of the invention.

What I claim as new and desire to secure by Letters Patent of the United States is:

1. A miniature thermostatic switch especially adapted for use in a temperature control system for a small electric motor, or the like; said switch comprising a base of electrically insulating material, an elongated resilient snap spring of electrically conducting material supported at one end thereof on one side of said base, first and second spaced stop members mounted on said one side of said base in positions such that the free end of said snap spring is disposed therebetween, a first electrical connection to said snap spring, a second electrical connection to said first stop member, said snap spring being initially locally deformed in a manner to render at least a portion thereof concavo-convex in cross-section to form an area which is sensitive to pressure for moving the free end of said snap spring from a first rest position against said first stop member to a second actuated position against said second stop member, said free end of said snap spring normally being in contact with said first stop member to complete an electrical circuit between said electrical connections and being movable into contact with said second stop member to interrupt said electrical circuit upon the application of a predetermined force to said sensitive area, a tube having one end thereof mounted on said base and extending outwardly therefrom from the other side thereof generally parallel to the path of movement of said spring and formed of a metal having a first coefficient of thermal expansion, a rod disposed in said tube and having one end thereof thermally and mechanically connected to the other end of said tube and having the other end thereof extending outwardly beyond said one side of said base and having a second coefficient of thermal expansion less than said first coefficient of thermal expansion, a lever formed of heat insulating and electrical insulating material having one end thereof pivotally supported by said base and the other end thereof supported on said sensitive area of said snap spring, said lever extending generally perpendicular to said tube and said rod and generally parallel to said spring, and means interconnecting the other end of said rod and said lever for pivoting the lever relative to said rod in response to the relative movement between said base and the other end of said rod to apply the predetermined force to said sensitive area of said snap spring for operating the free end of said snap spring between the rest and actuated positions thereof while maintaining thermal and electrical insulation between said rod and said snap spring, the sensitive area of said spring being located between said other end of the lever and said base, the free end of said spring being spaced from the axis of said rod and tube in a direction perpendicular to such axis by a distance greater than such spacing of said other end of said lever.

2. A miniature thermostatic switch especially adapted for use in a temperature control system for a small electric motor, or the like; said switch comprising a base of heat insulating and electrically insulating material, an elongated resilient snap spring of electrically conducting material supported at one end thereof on one side of said base, first and second spaced stop members mounted on said one side of said base in positions such that the free end of said snap spring is disposed therebetween, a first electrical connection on the other side of said base connecting to said snap spring, a second electrical connection on said other side of said base connecting to said first stop member, said snap spring being initially locally deformed in a manner to render at least a portion thereof concavo-convex in cross section to form an area which is sensitive to pressure for moving the free end of said snap spring from a first rest position against said first stop member to a second actuated position against said second stop member, said free end of said snap spring normally being in contact with said first stop member to complete an electrical circuit between said electrical connections and being movable into contact with said second stop member to interrupt said electrical circuit upon the application of a predetermined force to said sensitive area, a tube having one end thereof mounted on said base and extending outwardly therefrom from the other side thereof generally parallel to the path of movement of said spring and formed of a metal having a first coefficient of thermal expansion, a sleeve of electrical insulating material disposed about the portion of said tube extending outwardly from said base, a rod disposed in said tube and having one end thereof thermally and mechanically connected to the other end of said tube and having the other end thereof extending outwardly beyond said one side of said base and having a second coefficient of thermal expansion less than said first coefficient of thermal expansion, a lever formed of heat insulating and electrical insulating material having one end thereof pivotally supported by said base and the other end thereof supported by said sensitive area of said snap spring, said lever extending generally perpendicular to said tube and said rod and generally parallel to said spring, means interconnecting the other end of said rod and said lever for pivoting said lever relative to said rod in response to the relative movement between said base and the other end of said rod to apply the predetermined force to said sensitive area of said snap spring for operating the free end of said snap spring between the rest and actuated positions thereof while maintaining thermal and electrical insulation between said rod and said snap spring, and a casing of electrical insulating and heating insulating material mounted on said base and covering all of the parts disposed on said one side of said base, the sensitive area of said spring being located between said other end of the lever and said base, the free end of said spring being spaced from the axis of said rod and tube in a direction perpednicular to such axis by a distance greater than such spacing of said other end of said lever.

3. A miniature thermostatic switch especially adapted for use in a temperature control system for a small electric motor, or the like; said switch comprising a base of electrically insulating material, an elongated resilient snap spring of electrically conducting material supported at one end thereof on one side of said base, first and second spaced stop members mounted on said one side of said base in positions such that the free end of said snap spring is disposed therebetween, a first electrical connection to said snap spring, a second electrical connection to said first stop member, said snap spring being initially locally deformed in a manner to render at least a portion thereof concavo-convex in cross section to form an area which is sensitive to pressure for moving the free end of said snap spring from a first rest position against said first stop member to a second actuated position against said second stop member, said free end of said snap spring normally being in contact with said first stop member to complete an electrical circuit between said electrical connections and being movable into contact with said second stop member to interrupt said electrical circuit upon the application of a first predetermined force to said sensitive area and being held in said actuated position upon the continued application of a second predetermined force to said sensitive area, a tube having one end thereof mounted on said base and extending outwardly therefrom from the other side thereof and formed of a metal having a first coefficient of thermal expansion, a rod disposed in said tube and having one end thereof thermally and mechanically connected to the other end of said tube and having the other end thereof extending outwardly beyond said one side of said base and having a second coefficient of thermal expansion less than said first coefficient of thermal expansion, a lever formed of heat insulating and electrical insulating material having one end thereof supported by said base and the other end thereof supported on said sensitive area of said snap spring, and means interconnecting the other end of said rod and said lever for trsnsmitting the relative movement between said base and the other end of said rod to said sensitive area of said snap spring, the dimensions of said tube and said rod and said snap spring being such that said tube and rod exhibit elastic dimensional changes independent of thermal dimensional changes and about one-half of the force generated by the temperature change required to move said snap spring between the first and second positions thereof corresponds to said first predetermined force and results in movement of said one end of said rod and approximately one-half of said generated force corresponds to said second predetermined force and is stored in the form of elastic compression and tension in said tube and said rod produced by counterforces exerted on the rod and tube by said spring through said lever, said second force being released in response to movement of said free end of said snap spring from said first position to said second position thereof so that said one end of said rod moves a distance sufficient to cause said lever to follow said sensitive area of said snap spring and to apply said second predetermined force thereto.

4. A miniature thermostatic switch especially adapted for use in a temperature control system for a small electric motor, or the like; said switch comprising a base of electrically insulating material, an elongated resilient snap spring of electrically conducting material supported at one end therof on one side of said base, first and second spaced stop members mounted on said one side of said base in positions such that the free end of said snap spring is disposed therebetween, a first electrical connection to said snap spring, a second electrical connection to said first stop member, said snap spring being initially locally deformed in a manner to render at least a portion thereof concavo-convex in cross section to form an area which is sensitive to pressure for moving the free end of said snap spring from a first rest position against said first stop member to a second actuated position against said second stop member, said free end of said snap spring normally being in contact with said first stop member to complete an electrical circuit between said electrical connections and being movable into contact with said second stop member to interrupt said electrical circuit upon the application of a first predetermined force to said sensitive area and being held in said actuated position upon the continued application of a second predetermined force to said sensitive area, a tube having one end thereof mounted on said base and extending outwardly therefrom from the other side thereof and formed of a metal having a first coefficient of thermal expansion, the ratio of the surface area of said tube to the volume of said tube being at least 40 thereby to insure quick response thereof to changes of temperature in the associated motor, a rod disposed in said tube and having one end thereof thermally and mechanically connected to the other end of said tube and having the other end thereof extending outwardly beyond said one side of said base and having a second coefficient of thermal expansion less than said first coefficient of thermal expansion, a lever formed of heat insulating and electrical insulating material having one end thereof supported by said base and the other end thereof supported on said sensitive area of said snap spring, and means interconnecting the other end of said rod and said lever for transmitting the relative movement between said base and the other end of said rod to said sensitive area of said snap spring, the dimensions of said tube and said rod and said snap spring being such that said tube and rod exhibit elastic dimensional changes independent of thermal dimensional changes and about one-half of the force generated by the temperature change required to move said snap spring between the first and second positions thereof corresponds to said first predetermined force and results in movement of said one end of said rod and approximately one-half of said generated force corresponds to said second force and is stored in the form of the elastic compression and tension of said tube and rod produced by counterforces exerted on said tube and rod by said spring through said lever, said second force being released in response to movement of said free end of said snap spring from said first position to said second position thereof so that said one end of said rod moves a distance sufficient to cause said lever to follow said sensitive area of said snap spring and to apply said second predetermined force thereto.

5. A miniature thermostatic switch especially adapted for use in a temperature control system for a small electric motor, or the like; said switch comprising a base of electrically insulating material, an elongated resilient snap spring of electrically conducting material supported at one end thereof on one side of said base, first and second spaced stop members mounted on said one side of said base in positions such that the free end of said snap spring is disposed therebetween, a first electrical connection to said snap spring, a second electrical connection to said first stop member, said snap spring being initially locally deformed in a manner to render at least a portion thereof concavo-convex in cross section to form an area which is sensitive to pressure for moving the free end of said snap spring from a first rest position against said first stop member to a second actuated position against said second stop member, said free end of said snap spring normally being in contact with said first stop member to complete an electrical circuit between said electrical connecions and being movable into contact with said second stop member to interrupt said electrical circuit upon the application of a first predetermined force to said sensitive area and being held in said actuated position upon the continued application of a second predetermined force to said sensitive area, a tube having one end thereof mounted on said base and extending outwardly therefrom from the other side thereof and formed of a metal having a first coefficient of thermal expansion, the ratio of the surface area of said tube to the volume of said tube being at least 40 thereby to insure quick response thereof to changes of temperature in the associated motor, the ratio between the diameter of said tube and the wall thickness thereof being about 8 thereby to permit said tube to undergo substantial elastic compression, a rod disposed in said tube and having one end thereof thermally and mechanically connected to the other end of said tube and having the other end thereof extending outwardly beyond said one side of said base and having a second coefficient of thermal expansion less than said first coefficient of thermal expansion, a lever formed of heat insulating and electrical insulating material having one end thereof supported by said base and the other end thereof supported on said sensitive area of said snap spring, and means interconnecting the other end of said rod and said lever for transmitting the relative movement between said base and the other end of said rod to said sensitive area of said snap spring, the dimensions of said tube and said rod and said snap spring being such that about one-half of the force generated by the temperature change required to move said snap spring between the first and second positions thereof corresponds to said first predetermined force and results in movement of said one end of said rod and approximately one-half of said generated force corresponds to said second predetermined force and is stored in the form of the elastic compression and tension of said tube and rod produced by counterforces exerted on said rod and tube by said spring through said lever, said second force being released in response to movement of said free end of said snap spring from said first position to said second position thereof so that said one end of said rod moves a distance sufficient to cause said lever to follow said sensitive area of said snap spirng and to apply said second predetermined force thereto.

6. A miniature thermostatic switch especially adapted for use in a temperature control system for a small electric motor, or the like; said switch comprising a base of electrically insulating material, and elongated resilient snap spring of electrically conducting material supported at one end thereof on one side of said base, first and second spaced stop members mounted on said one side of said base in positions such that the free end of said snap spring is disposed therebetween, a first electrical connection to said snap spring, a second electrical connection to said first stop member, said snap spring being initially locally deformed in a manner to render at least a portion thereof concavo-convex in cross section to form an area which is sensitive to pressure for moving the free end of said snap spring from a first rest position against said first stop member to a second actuated position against said second stop member, said free end of said snap spring normally being in contact with said first stop member to complete an electrical circuit between said electrical connections and being movable into contact with said second stop member to interrupt said electrical circuit upon the application of a first predetermined force to said sensitive area and being held in said actuated position upon the continued application of a second predetermined force to said sensitive area, a tube having one end thereof mounted on said base and extending outwardly therefrom from the other side thereof and formed of a metal having a first coefficient of thermal expansion, the ratio of the surface area of said tube to the volume of said tube being at least 40 thereby to insure quick response thereof to changes of temperature in the associated motor, the ratio between the diameter of said tube and the wall thickness thereof being about 8 thereby to permit said tube to undergo systematic elastic compression, a rod disposed in said tube and having one end thereof thermally and mechanically connected to the other end of said tube and having the other end thereof extending outwardly beyond said one side of said base and having a second coefficient of thermal expansion less than said first coefficient of thermal expansion, the ratio between the cross sectional area of said rod and the cross sectional area of said tube being about 6, a lever formed of heat insulating and electrical insulating material having one end thereof supported by said base and the other end thereof supported on said sensitive area of said snap spring, and means interconnecting the other end of said rod and said lever for transmitting the relative movement between said base and the other end of said rod to said sensitive area of said snap spring, the dimensions of said tube and said rod and said snap spring being such that about one-half of the force generated by the temperature change required to move said snap spring between the first and second positions thereof corresponds to said first predetermined force and results in movement of said one end of said rod and approximately one-half of said generated force corresponds to said second predetermined force and is stored in the form of the elastic compression and tension of said tube and rod produced by counterforces exerted upon said tube and rod by said spring through said lever, said second force being released in response to movement of said free end of said snap spring from said first position to said second position thereof so that said one end of said rod moves a distance sufficient to cause said lever to follow said sensitive area of said snap spring and to apply said second predetermined force thereto.

7. A miniature thermostatic switch comprising a base of electrically and heat insulating material, a switch including an elongated resilient snap spring of electrically conducting material supported at one end on one side of said base, said spring being constructed for snap movement from a first position wherein it completes an electrical circuit to a second position wherein it interrupts the circuit in response to the application of a first force thereto, a tube having one end mounted on said base and extending from the other side of the base generally parallel to the path of movement of said spring, a rod disposed in said tube and having one end thermally and mechanically connected to the other end of said tube and having its other end extending outwardly beyond said one side of the base, said tube and said rod being formed of metals having different coefficients of thermal expansion with the rod having a coefficient less than that of the tube, a lever formed of heat insulating and electrical insulating material having one end pivotally supported on said base and having its other end on a part of said spring, said lever extending generally perpendicular to said tube and said rod and generally parallel to said spring, means loosely interconnecting the other end of said rod and said lever to effect pivotal movement of said lever relative to said rod in response to relative movement between said base and the other end of said rod, said part of said spring being located between said other end of the lever and said base, said spring having a free end spaced from the axis of said rod and tube in a direction perpendicular to such axis by a distance greater than such spacing of said other end of said lever, and a casing of heat insulating and electrical insulating material mounted on said base and covering all of the parts disposed on said one side of the base.

8. A miniature thermostatic switch comprising a base of electrically insulating and heat insulating material, a switch including an elongated resilient snap spring of electrically conducting material supported at one end on one side of said base, said spring being constructed for snap movement from a first position wherein it completes an electrical circuit to a second position wherein it interrupts the circuit in response to the application of a first force thereto, a tube having one end mounted on said base and extending from the other side of the base generally parallel to the path of movement of said spring, a rod disposed in said tube and having one end thermally and mechanically connected to the other end of said tube and having its other end extending outwardly beyond said one side of the base, said tube and said rod being formed of metals having different coefficients of thermal expansion with the rod having a coefficient less than that of the tube, a lever formed of heat insulating and electrical insulating material having one end pivotally supported on said base and its other end on said spring, said lever extending generally perpendicular to said tube and said rod and generally parallel to said spring, means loosely interconnecting the other end of said rod and said lever to effect pivotal movement of said lever relative to said rod in response to relative movement between said base and the other end of said rod, and a casing of heat insulating and electrical insulating material mounted on said base and covering all of the parts disposed on said one side of the base, dimensions of said tube and said rod being selected such that the tube and the rod exhibit elastic dimensional changes independent of thermal dimensional changes to store a second force produced by counterforces exerted on the rod and tube by said spring through said lever, said second force being released in response to movement of the spring to said second position for retaining the spring in the second position.

9. A miniature thermostatic switch comprising a base of electrically insulating and heat insulating material, an elongated resilient snap spring of electrically conducting material supported at one end thereof on one side of said base, first and second spaced stop members mounted on said one side of said base in positions such that the free end of said snap spring is disposed therebetween, a first electrical connection to said snap spring, a second electrical connection to said first stop member, said snap spring being initially locally deformed in a manner to render at least a portion thereof concavo-convex in cross-section to form an area which is sensitive to pressure for moving the free end of said snap spring from a first rest position against said first stop member to a second actuated position against said second stop member, said free end of said snap spring normally being in contact with said first stop member to complete an electrical circuit between said electrical connections and being movable into contact with said second stop member to interrupt said electrical circuit upon the application of a predetermined force to said sensitive area, a tube having one end thereof mounted on said base and extending outwardly therefrom from the other side thereof generally parallel to the path of movement of said spring and formed of a metal having a first coefficient of thermal expansion, a rod disposed in said tube and having one end thereof thermally and mechanically connected to the other end of said tube and having the other end thereof extending outwardly beyond said one side of said base and having a second coefficient of thermal expansion less than said first coefficient of thermal expansion, a lever formed of heat insulating and electrical insulating material having one end thereof pivotally supported by said base and the other end thereof supported on said sensitive area of said snap spring, said lever extending generally perpendicular to said tube and said rod and generally parallel to said spring, and means interconnecting the other end of said rod and said lever for pivoting the lever relative to said rod to apply the predetermined force to said sensitive area of said snap spring for operating the free end of said snap spring between the rest and actuated positions thereof while maintaining thermal and electrical insulation between said rod and said snap spring, dimensions of said tube and said rod being selected such that the tube and the rod exhibit elastic dimensional changes independent of thermal dimensional changes to store a second force produced by counterforces exerted on the rod and tube by said spring through said lever, said second force being released in response to movement of the spring to said second position for retaining the spring in the second position.

10. A miniature thermostatic switch comprising a base of electrically insulating and heat insulating material, an elongated resilient snap spring of electrically conducting material supported at one end thereof on one side of said base, first and second spaced stop members mounted on said one side of said base in positions such that the free end of said snap spring is disposed therebetween, a first electrical connection to said snap spring, a second electrical connection to said first stop member, said snap spring being initially locally deformed in a manner to render at least a portion thereof concavo-convex in cross-section to form an area which is sensitive to pressure for moving the free end of said snap spring from a first rest position against said first stop member in a direction away from said base to a second actuated position against said second stop member, said free end of said snap spring normally being in contact with said first stop member to complete an electrical circuit between said electrical connections and being movable into contact with said second stop member to interrupt said electrical circuit upon the application of a predetermined force to said sensitive area which acts towards said base, a tube having one end thereof mounted on said base and extending outwardly therefrom from the other side thereof generally parallel to the path of movement of said spring and formed of a metal having a first coefficient of thermal expansion, a rod disposed in said tube and having one end thereof thermally and mechanically connected to the other end of said tube and having the other end thereof extending outwardly beyond said one side of said base and having a second coefficient of thermal expansion less than said first coefficient of thermal expansion, a lever formed of heat insulating and electrical insulating material having one end thereof pivotally supported by said base and the other end thereof supported on said sensitive area of said snap spring, said lever extending generally perpendicular to said tube and said rod and generally parallel to said spring with the sensitive area of said spring located between said other end of the lever and said base and with the free end of said spring spaced further from said rod and tube than said other end of said lever, said one end of said lever having an opening through which extends said other end of said rod, said other end of said rod having an enlarged head, and a bushing surrounding said enlarged head and engaging said one end of said lever with said one end of said lever intermediate the bushing and said base whereby said other end of said lever is pivoted towards said base to apply the predetermined force to said sensitive area of said spring for operating the free end of said spring away from said base into contact with said second stop member in response to heating of said rod and tube.

References Cited in the file of this patent

UNITED STATES PATENTS

| 1,736,979 | Mottlau | Nov. 26, 1929 |
| 1,780,758 | Leupold | Nov. 4, 1930 |
| 1,939,285 | Spencer | Dec. 12, 1933 |
| 2,044,822 | Vaughn | June 23, 1936 |
| 2,417,341 | Arant | Mar. 11, 1947 |
| 2,793,270 | Burch et al. | May 21, 1957 |
| 2,851,559 | Rosen | Sept. 9, 1958 |
| 2,853,582 | Rosen | Sept. 23, 1958 |

FOREIGN PATENTS

| 671,058 | Great Britain | Apr. 30, 1952 |